US012798412B2

(12) United States Patent
Ulsaker et al.

(10) Patent No.: US 12,798,412 B2
(45) Date of Patent: Nov. 17, 2026

(54) ELECTRIC VEHICLE BUSWAY WITH INTEGRATED CABLE HANGER

(71) Applicant: EATON INTELLIGENT POWER LIMITED, Dublin (IE)

(72) Inventors: Jonathan Ulsaker, Anderson, SC (US); Walter James Lawlor, Hodges, SC (US); Archit Agarwal, Greenwood, SC (US); Philip Miller, Edgefield, SC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 542 days.

(21) Appl. No.: 18/389,328

(22) Filed: Nov. 14, 2023

(65) Prior Publication Data

US 2025/0153585 A1 May 15, 2025

(51) Int. Cl.
*B60L 53/18* (2019.01)
*B60L 53/30* (2019.01)

(52) U.S. Cl.
CPC ............... *B60L 53/18* (2019.02); *B60L 53/30* (2019.02)

(58) Field of Classification Search
CPC .......... B60L 53/18; B60L 53/30; B60L 53/16; B60L 53/31; B60L 53/35; H02G 5/08; H02G 11/003; H02G 11/006; Y02T 10/70; Y02T 10/7072
See application file for complete search history.

(56) References Cited

U.S. PATENT DOCUMENTS

2023/0158909 A1* 5/2023 Goddard ................. B60L 53/35
174/74 R

FOREIGN PATENT DOCUMENTS

CN 116587898 A * 8/2023 ............. H02G 11/00
EP 3 412 497 A1 12/2018
TW I 749 839 B 12/2021

OTHER PUBLICATIONS

European Patent Office "Extended European Search Report" for corresponding EP Patent Application No. 24211939.4, dated Nov. 7, 2025, 11 pp.

* cited by examiner

*Primary Examiner* — Elim Ortiz
(74) *Attorney, Agent, or Firm* — Eckert Seamans Cherin & Mellott, LLC

(57) ABSTRACT

Embodiments of a busway system that includes an integrated cable hanger for use with an EV charging system are disclosed. The integration of the cable hanger into the busway allows users to access the EV charging connectors of the EV charging system while maintaining the busway at a height above that which would be accessible by a user, thus minimizing the likelihood of damage to several components of the EV charging system. The cable hanger includes a cable hook which can be used to hang the cable of an EV connector. In some embodiments, the cable hanger is structured to enable the cable hook to be lowered from the busway and raised back up, and in other embodiments, the cable hanger maintains the cable hook at a pre-set height below the busway.

10 Claims, 6 Drawing Sheets

ELECTRIC VEHICLE BUSWAY WITH INTEGRATED CABLE HANGER

FIELD OF THE INVENTION

The disclosed concept pertains generally to electric vehicle (EV) charging systems and, more particularly, to cable management for EV charging systems.

BACKGROUND OF THE INVENTION

Traditional EV charging systems for applications involving public, private, and fleet vehicle charging of electric vehicles typically utilize underground, ground-mounted, or wall-mounted electrical power distribution. These traditional charging systems can lead to cables and handles of charging connectors being placed or dropped on floor areas, causing damage to these items and posing trip hazards. The potential for the occurrence of such damage or trip hazards increases in a larger facility having a high number of charging connectors, such as a warehouse used for a fleet of delivery vehicles.

There is thus room for improvement in EV charging systems, and in cable management systems therefor.

SUMMARY OF THE INVENTION

These needs, and others, are met by embodiments of an improved busway system that includes an integrated cable hanger for use with an EV charging system. The integration of the cable hanger into the busway enables users to be able to access the EV charging connectors of the EV charging system while enabling the busway to be disposed at a position higher than the height of the parked vehicles that would be charged with the EV charging system, thus minimizing the likelihood of damage to several of the components of the EV charging system. The cable hanger includes a cable hook which can be used to hang the cable of an EV connector. In some embodiments, the cable hanger is structured to enable the cable hook to be lowered from the busway to a height that enables the EV connector to interface with an electrical vehicle for charging, and to enable the cable hook to be raised back up toward the busway after charging is over, on an as-needed basis. In other embodiments, the cable hanger enables the cable hook to be maintained at a pre-set height below the busway so that the EV connector is accessible at all times for insertion into an electrical vehicle for charging.

In accordance with one aspect of the disclosed concept, a busway system for use with an electric vehicle (EV) charging system includes a busway and a cable hanger. The busway is structured to electrically connect to a power source and to enable an EV connector to electrically connect to the busway. The cable hanger comprises a support structure and a cable hook structured to hang a cable of the EV connector. The support structure comprises a plurality of supports coupled to one another. The support structure is coupled at a first end to the busway, and the cable hook is coupled to a second end of the support structure disposed opposite the first end. The busway system is structured to enable the busway to be mounted with the support structure positioned below the busway, such that the cable hook is disposed below the first end of the support structure.

In accordance with another aspect of the disclosed concept, a busway system for use with an electric vehicle (EV) charging system includes a busway and a cable hanger. The busway is structured to electrically connect to a power source and to enable an EV connector to electrically connect to the busway. The cable hanger comprises a support structure and a cable hook structured to hang a cable of the EV connector. The support structure comprises a plurality of supports coupled to one another. The support structure is coupled at a first end to the busway, and the cable hook is coupled to a second end of the support structure disposed opposite the first end. The support structure is configured to be actuated between a plurality of support structure positions such that, for each support structure position in the plurality of support structure positions, there is a corresponding unique cable hook position that the cable hook assumes. For each unique cable hook position, the cable hook is disposed a unique distance away from the busway relative to every other unique cable hook position.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
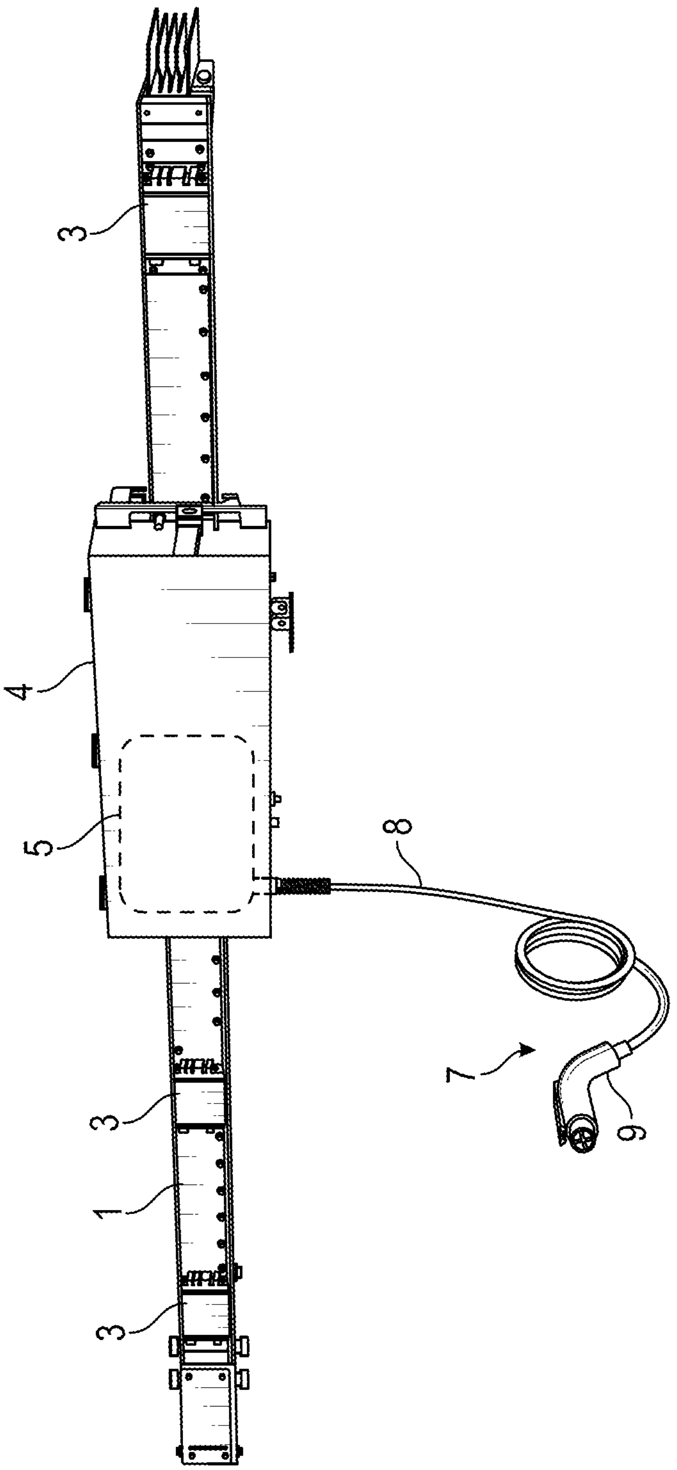
FIG. 1 (PRIOR ART)
FIG. 1 is a perspective view of a prior art busway for an EV charging system.

Directional phrases used herein, such as, for example, left, right, front, back, top, bottom and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As employed herein, the statement that two or more parts are "coupled" together shall mean that the parts are joined together either directly or joined through one or more intermediate parts or components, so long as a link occurs.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

Described herein are embodiments of an improved busway for an EV charging system. The disclosed busway embodiments include an integrated cable hanger that helps to mitigate the problems found in traditional charging systems iterated above.

FIG. 1 shows a prior art busway 1 for an EV charging system. The busway 1 can be connected to a power source (e.g. utility power) and includes several electrical connection points 3. The busway 1 is structured such that, for each electrical connection point 3, a busplug 4 can be coupled to the busway 1 in the proximity of the electrical connection point 3 so that the busplug 4 can tap into the conductors of the busway 1 in order to provide localized power distribution to an EV charger 5. The busplug 4 comprises a housing that can house the EV charger 5, along with any associated electrical equipment (such as, for example and without limitation, an overcurrent protection device). The EV charger 5 is shown in dashed line in FIG. 1 due to a front cover of the busplug 4 being closed and obscuring the EV charger 5 from view. The busplug 4 is structured to enable an EV connector 7 to electrically connect to the EV charger 5. Specifically, a first end of a cable 8 of the EV connector 7 can be coupled to the EV charger 5, and a handle 9 of the EV connector 7 disposed at a second end of the cable 8 can extend away from the busplug 4 in order to plug into and charge an electric vehicle.

Figure 3A:
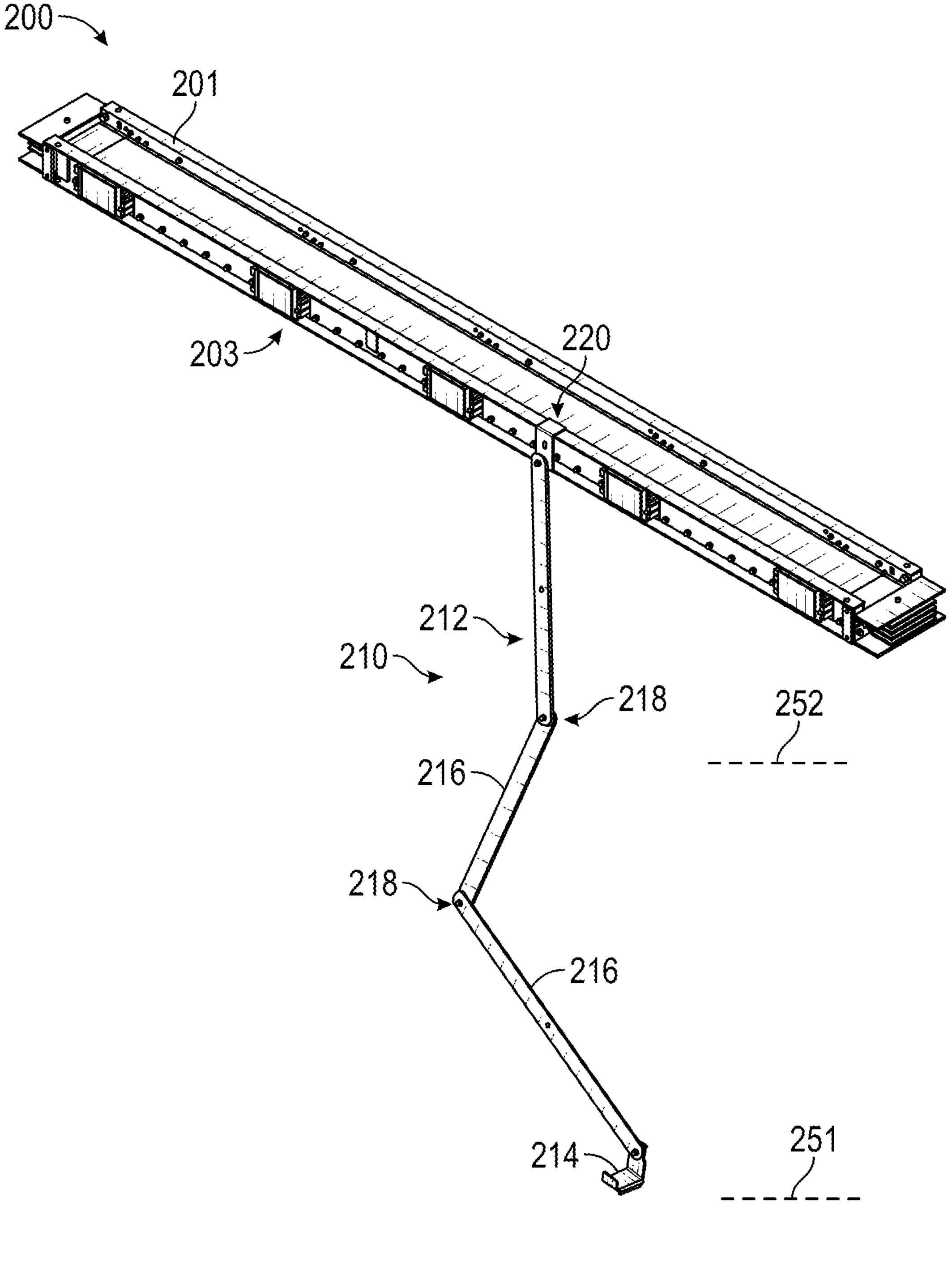
FIG. 3A is a perspective view of an improved busway system for an EV charging system that includes an integrated cable hanger with a Z-shaped hanger design, with the integrated cable hanger shown in an extended position, in accordance with another example embodiment of the disclosed concept.
Figure 3B:
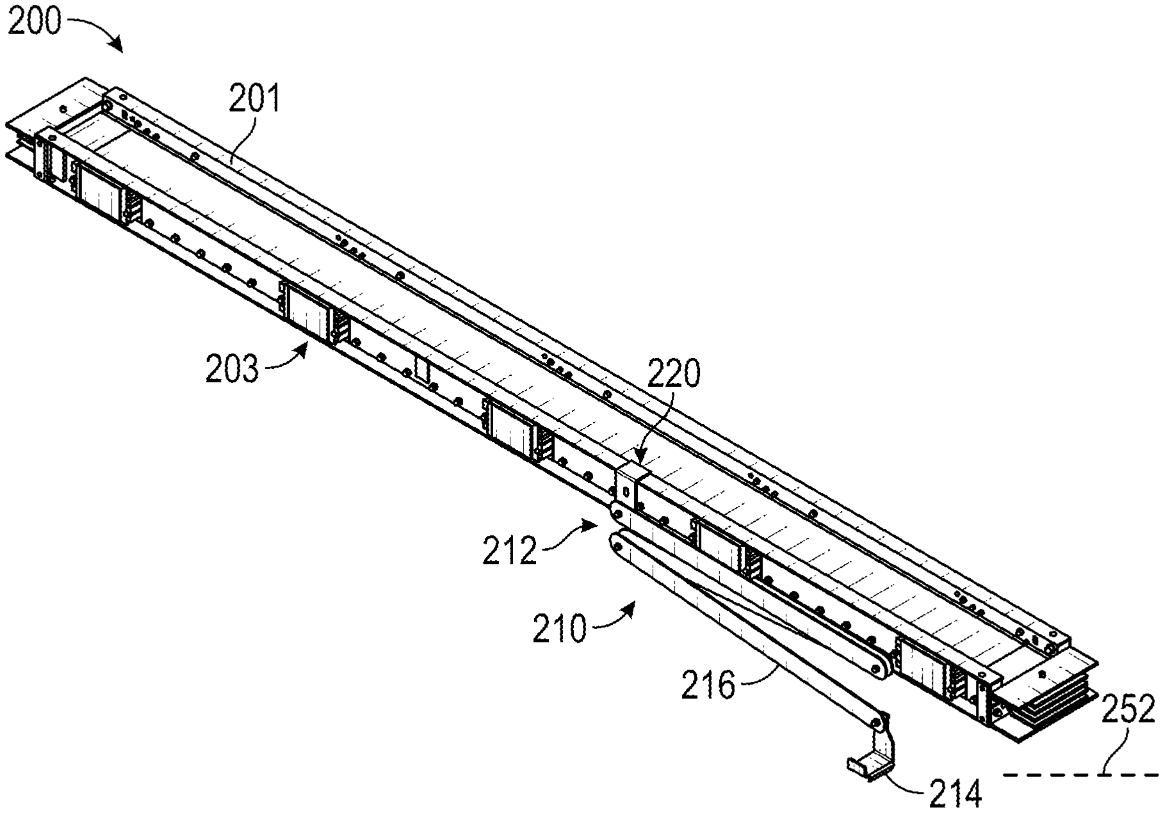
FIG. 3B shows the busway system shown in FIG. 3A, with the integrated cable hanger shown in a retracted position.
Figure 4:
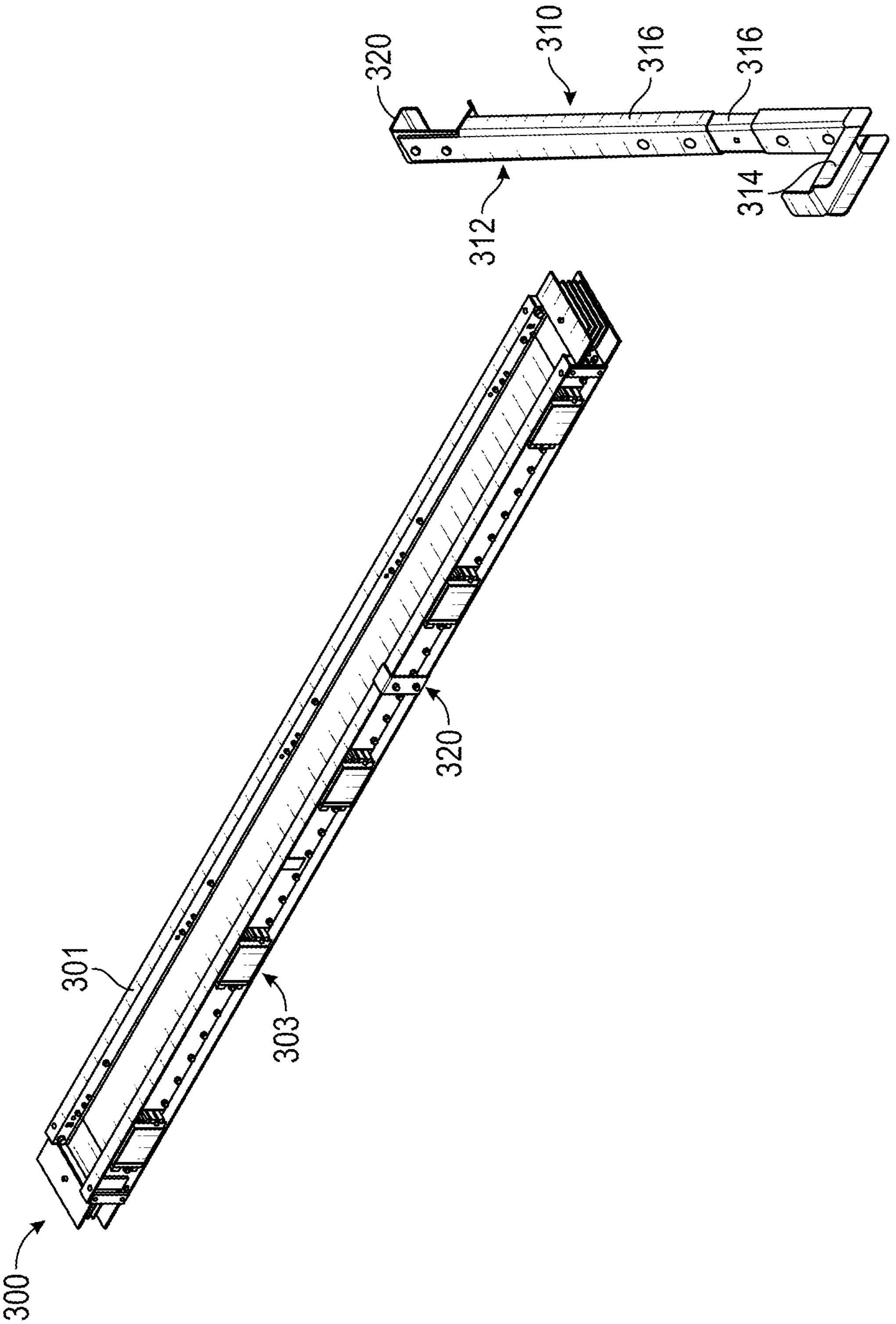
FIG. 4 is a perspective view of an improved busway system for an EV charging system that includes an integrated cable hanger with a fixed drop height design, in accordance with further example embodiment of the disclosed concept.

As an initial matter and prior to detailing each of the improved busway systems 100, 200, and 300 shown in FIGS. 2-4 individually, it is noted that the busway systems 100, 200, and 300 are designed for an owner/operator of an EV charging system that wants to mount the busway at a height sufficiently higher than the height of the parked vehicles that would be charged with the EV charging system, either by mounting the busway to a wall or ceiling or by suspending the busway from a ceiling. Mounting a busway above the height of the parked vehicles reduces the likelihood of accidental damage to components of the EV charging system. The busway systems 100, 200, 300 are designed to accommodate the desire to mount a busway at a relatively high height and are particularly well-suited for use in commercial or industrial settings (e.g. in order to charge a fleet of delivery vehicles), where there are a high number of electric vehicles and there is frequent charging of electric vehicles. In addition, it is noted that the cable of an EV connector (e.g. such as the cable 8 of the EV connector 7 shown in FIG. 1), particularly in a commercial or industrial setting such as a warehouse for a fleet of delivery vehicles, often has a length on the scale of 25 feet, so that the handle 9 of the EV connector 7 can easily extend from the busway to reach the charging port on a vehicle that needs charging.

Figure 2A:
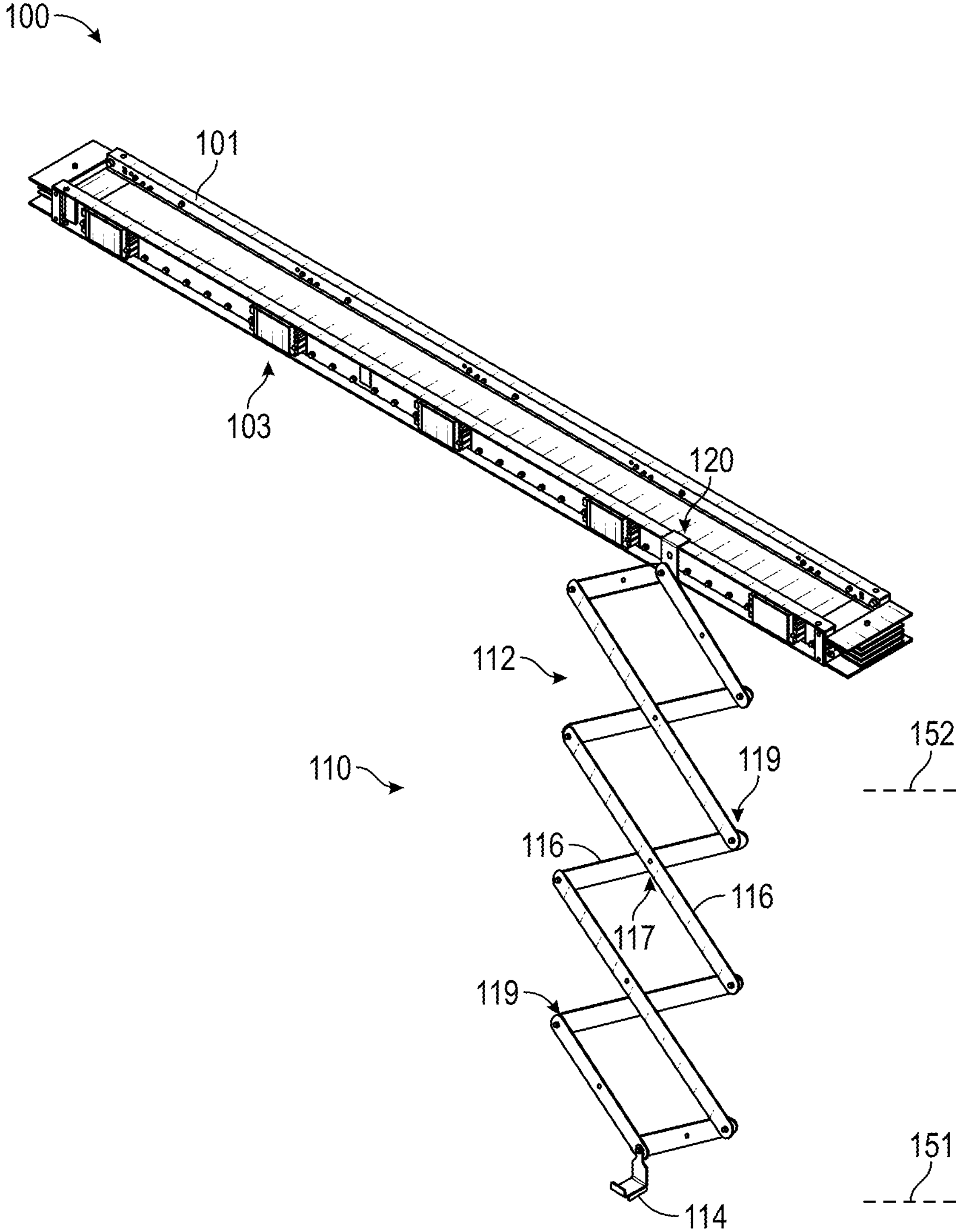
FIG. 2A is a perspective view of an improved busway system for an EV charging system that includes an integrated cable hanger with a scissor lift design, with the integrated cable hanger shown in an extended position, in accordance with an example embodiment of the disclosed concept.
Figure 2B:
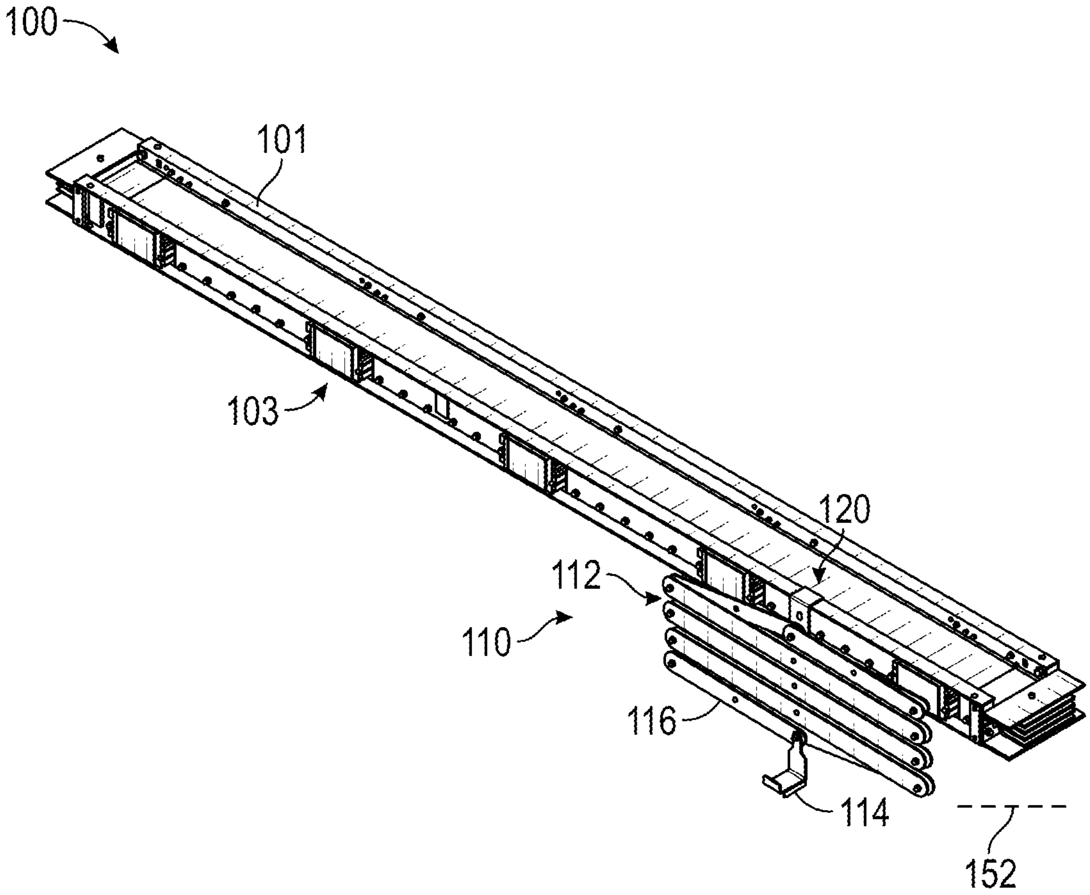
FIG. 2B shows the busway system shown in FIG. 2A, with the integrated cable hanger in a retracted position.

Reference is now made to FIGS. 2A and 2B, which show an improved busway system 100 for an EV charging system that includes an integrated cable hanger 110, in accordance with a first example embodiment of the disclosed concept. It is noted that the busway system 100 is structured to enable the busplug 4, EV charger 5, and EV connector 7 shown in FIG. 1 to be physically coupled and electrically connected to the busway system 100. The busway system 100 comprises a busway 101 that is structured to be connected to a power source (e.g. utility power) and that includes a plurality of electrical connection points 103 similar to the electrical connection points 3 shown in FIG. 1. The busway 101 is structured such that, for each electrical connection point 103, a busplug 4 can be coupled to the busway 101 in proximity to the electrical connection point 103, and an EV charger 5 and an EV connector 7 can be coupled to the busplug 4 and to one another, in a manner similar to that described in conjunction with the busway 1 and electrical connection points 3 shown in FIG. 1. Accordingly, an EV connector 7 can be powered by the power source through the busway 101. When an EV connector 7 is coupled to the busway 101, the integrated cable hanger 110 provides cable management that helps to contain the cable 8 of the EV connector 7, as detailed further below.

Continuing to refer to FIGS. 2A and 2B, the integrated cable hanger 110 comprises an extendable and retractable support structure 112 with an attached cable hook 114. The support structure 112 is structured as a scissor lift that comprises a plurality of supports 116 coupled to one another at a number of medial joints 117 and lateral joints 119 such that the supports 116 form a crisscrossed X pattern. The medial and lateral joints 117, 119 enable the supports 116 to move about the joints 117, 119 such that the supports 116 fold and expand relative to one another.

The support structure 112 can be coupled at a first end to the busway 101 by a bracket 120. The cable hook 114 is coupled to a second end of the support structure 112 disposed opposite the first end. The busway system 100 is structured to enable the busway 101 to be mounted with the support structure 112 positioned below the busway 101, such that the cable hook 114 is disposed below the first end of the support structure 112. The cable hook 114 is structured to hang the cable 8 of a nearby EV connector 7. For example and without limitation, the cable 8 can be wound into a series of loops (e.g. as shown in FIG. 1) and the loops can be hung on the cable hook 114. In addition, the support structure 112 is configured to be actuated between an extended position (as shown in FIG. 2A) and a retracted position (as shown in FIG. 2B). In the extended position, the support structure 112 is relatively more extended, such that the cable hook 114 is disposed at a first height and is relatively further away from the busway 101. Conversely, in the retracted position, the support structure 112 is relatively more collapsed/compressed, such that the cable hook 114 is disposed at a second height and is relatively closer to the busway 101. The first height is lower than the second height. For example and without limitation, as shown in FIG. 2A, the extended position can be one in which the cable hook 114 is positioned substantially in line with the dashed line 151 (the dashed line 151 being representative of the first height), and as shown in FIG. 2B, the retracted position can be one in which the cable hook 114 is positioned substantially in line with the dashed line 152 (the dashed line 152 being representative of the second height).

Still referring to FIGS. 2A and 2B, the support structure 112 can either be configured to be manually actuated between the extended and retracted positions (via, for example and without limitation, a crank that is positioned at a height that is accessible by a user), or can be configured to be actuated by an automated device (via, for example and without limitation, a remote control that is accessible by a user). Thus, in the event that the busway 101 of the busway system 100 is mounted high enough above the ground that the handle 9 of the EV connector 7 is not accessible by a user when the support structure 112 is in the retracted position and the cable 8 is hung on the cable hook 114, the handle 9 can be made accessible to a user by actuating the support structure 112 to the extended position.

Reference is now made to FIGS. 3A and 3B, which show an improved busway system 200 for an EV charging system that includes an integrated cable hanger 210, in accordance with a second example embodiment of the disclosed concept. It is noted that the busway system 200 is structured to enable the busplug 4, EV charger 5, and EV connector 7 shown in FIG. 1 to be physically coupled and electrically connected to the busway system 200. The busway system 200 comprises a busway 201 that is structured to be connected to a power source (e.g. utility power) and that includes a plurality of electrical connection points 203 similar to the electrical connection points 3 shown in FIG. 1. The busway 201 is structured such that, for each electrical connection point 203, a busplug 4 can be coupled to the busway 201 in proximity to the electrical connection point 203, and an EV charger 5 and an EV connector 7 can be coupled to the busplug 4 and to one another, in a manner similar to that described in conjunction with the busway 1 and electrical connection points 3 shown in FIG. 1. Accordingly, an EV connector 7 can be powered by the power source through the busway 101. When an EV connector 7 is coupled to the busway 201, the integrated cable hanger 210 provides cable management that helps to contain the cable 8 of the EV connector 7, as detailed further below.

Continuing to refer to FIGS. 3A and 3B, the integrated cable hanger 210 comprises an extendable and retractable support structure 212 with an attached cable hook 214. The support structure 212 is structured as a Z-shaped hanger that comprises a plurality of supports 216 coupled to one another at a number of joints 218 such that the supports 216 form a Z-shaped formation. The joints 218 enable the supports 216 to move about the joints 218. More specifically, each joint 218 enables the supports 216 that comprise the joint 218 to rotate about the joint 218.

The support structure 212 can be coupled at a first end to the busway 201 by a bracket 220. The cable hook 214 is coupled to a second end of the support structure 212 disposed opposite the first end. The busway system 200 is structured to enable the busway 201 to be mounted with the support structure 212 positioned below the busway 201, such that the cable hook 214 is disposed below the first end of the support structure 212. The cable hook 214 is structured to hang the cable 8 of a nearby EV connector 7. For example and without limitation, the cable 8 can be wound into a series of loops (e.g. as shown in FIG. 1) and hung on the cable hook 214. In addition, the support structure 212 is configured to be actuated between an extended position (as shown in FIG. 3A) and a retracted position (as shown in FIG. 3B). In the extended position, the support structure 212 is relatively more extended, such that the cable hook 214 is disposed at a first height and is relatively further away from the busway 201. Conversely, in the retracted position, the support structure 212 is relatively more collapsed/compressed, such that the cable hook 214 is disposed at a second height and is relatively closer to the busway 201. The first height is lower than the second height. For example and without limitation, as shown in FIG. 3A, the extended position can be one in which the cable hook 214 is positioned substantially in line with the dashed line 251 (the dashed line 251 being representative of the first height), and as shown in FIG. 3B, the retracted position can be one in which the cable hook 214 is positioned substantially in line with the dashed line 252 (the dashed line 252 being representative of the second height).

Still referring to FIGS. 3A and 3B, the support structure 212 can either be configured to be manually actuated between the extended and retracted positions (via, for example and without limitation, a crank that is positioned at a height that is accessible by a user), or can be configured to be actuated by an automated device (via, for example and without limitation, a remote control that is accessible by a user). Thus, in the event that the busway 201 of the busway system 200 is mounted high enough above the ground that the handle 9 of the EV connector 7 is not accessible by a user when the support structure 212 is in the retracted position and the cable 8 is hung on the cable hook 214, the handle 9 can be made accessible to a user by actuating the support structure 212 to the extended position.

Regarding both the busway system 100 shown in FIGS. 2A-2B and the busway system 200 shown in FIGS. 3A-3B, it is noted that the dashed lines 151 and 152 (denoted for the support structure 112) and the dashed lines 251 and 252 (denoted for the support structure 212) are provided as illustrative examples of the difference between an extended position and a retracted position of the respective support structure 112 or 212, and that these illustrative examples are non-limiting. It should be understood that the support structure 112 and the support structure 212 are structured to be actuated between a plurality of positions. That is, there can be more than one unique position that can be considered an extended position, and there can be more than one unique position that can be considered a retracted position. For example and without limitation, all of the unique positions of the support structure 112 or 212 that are considered extended positions can be differentiated from the retracted positions due to the extended positions being those in which the cable hook 114 or 214 is closer to the proximity of the dashed line 151 or 251 than to the proximity of the dashed line 152 or 252. For each unique position of the support structure 112 or 212, the cable hook 114 or 214 assumes a corresponding unique position such that the cable hook 114 or 214 is disposed a unique distance away from the busway 101 or 201 relative to the position that the cable hook 114 or 214 assumes when the support structure 112 or 212 is disposed in any other position.

Reference is now made to FIG. 4, which shows an improved busway system 300 for an EV charging system that includes an integrated cable hanger 310, in accordance with a third example embodiment of the disclosed concept. In FIG. 4, the cable hanger 310 is shown de-coupled from a busway 301 of the busway system 300 in order to better portray certain features of the cable hanger 310. It is noted that the busway system 300 is structured to enable the busplug 4, EV charger 5, and EV connector 7 shown in FIG. 1 to be physically coupled and electrically connected to the busway system 300. The busway system 300 comprises a busway 301 that is structured to be connected to a power source (e.g. utility power) and that includes a plurality of electrical connection points 303 similar to the electrical connection points 3 shown in FIG. 1. The busway 301 is structured such that, for each electrical connection point 303, a busplug 4 can be coupled to the busway 301 in proximity to the electrical connection point 303, and an EV charger 5 and an EV connector 7 can be coupled to the busplug 4 and to one another, in a manner similar to that described in conjunction with the busway 1 and electrical connection points 3 shown in FIG. 1. Accordingly, an EV connector 7 can be powered by the power source through the busway 301. When an EV connector 7 is coupled to the busway 301, the integrated cable hanger 310 provides cable management that helps to contain the cable 8 of the EV connector 7, as detailed further below.

Continuing to refer to FIG. 4, the integrated cable hanger 310 comprises a fixed height support structure 312 with an attached cable hook 314. The support structure 312 can be coupled at a first end to the busway 301 by a bracket 320. The cable hook 314 is coupled to the second end of the support structure 312 disposed opposite the first end. The busway system 300 is structured to enable the busway 301 to be mounted with the support structure 312 positioned below the busway 301, such that the cable hook 314 is disposed below the first end of the support structure 312. The cable hook 314 is structured to hang the cable 8 of a nearby EV connector 7. For example and without limitation, the cable 8 can be wound into a series of loops (e.g. as shown in FIG. 1) and the loops can be hung on the cable hook 314.

The support structure 312 comprises a number of supports 316 that are fixedly coupled to one another (for example and without limitation, using bolts), and in contrast with the cable hangers 110 and 210, the support structure 312 is not structured to be actuated between multiple positions that changes the distance between the cable hook 314 and the busway 301. Instead, the cable support structure 312 is structured to enable the cable 8 of an EV connector 7 to be hung on the cable hook 314 at a single fixed height.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A busway system for use with an EV charging system, the busway system comprising:
- a busway structured to electrically connect to a power source and to enable an EV connector to electrically connect to the busway; and
- a cable hanger, the cable hanger comprising:
  - a support structure, the support structure comprising a plurality of supports coupled to one another; and
  - a cable hook structured to hang a cable of the EV connector,
- wherein the support structure is coupled at a first end to the busway,
- wherein the cable hook is coupled to a second end of the support structure disposed opposite the first end,
- wherein the busway system is structured to enable the busway to be mounted with the support structure positioned below the busway, such that the cable hook is disposed below the first end of the support structure,
- wherein the support structure is configured to be actuated between an extended position and a retracted position,
- wherein, in the extended position, the cable hook is disposed at a first height,
- wherein, in the retracted position, the cable hook is disposed at a second height, and
- wherein the first height is lower than the second height,
- wherein the plurality of supports are coupled to one another by a number of joints, and
- wherein, for each given joint, the given joint is structured to enable the supports that form the given joint to move about the given joint.

2. The busway system of claim 1,
wherein the support structure is configured to be manually actuated between the extended position and the retracted position.

3. The busway system of claim 1,
wherein the support structure is configured to be actuated between the extended position and the retracted position by an automated device.

4. The busway system of claim 1,
wherein the number of joints includes a number of medial joints and a number of lateral joints,
wherein the plurality of supports form a crisscrossed X pattern, and
wherein the medial joints and lateral joints enable the plurality of supports to fold and expand.

5. The busway system of claim 1,
wherein the plurality of supports form a Z-shaped formation, and
wherein the joints enable the plurality of supports to rotate.

6. A busway system for use with an EV charging system, the busway system comprising:
- a busway structured to electrically connect to a power source and to enable an EV connector to electrically connect to the busway; and
- a cable hanger, the cable hanger comprising:
  - a support structure, the support structure comprising a plurality of supports coupled to one another; and
  - a cable hook structured to hang a cable of the EV connector,
- wherein the support structure is coupled at a first end to the busway,
- wherein the cable hook is coupled to a second end of the support structure disposed opposite the first end,
- wherein the support structure is configured to be actuated between a plurality of support structure positions such that, for each support structure position in the plurality of support structure positions, there is a corresponding unique cable hook position that the cable hook assumes,
- wherein the support structure is structured such that, for each unique cable hook position, the cable hook is disposed a unique distance away from the busway relative to every other cable hook position,
- wherein the plurality of support structure positions includes a plurality of extended positions and a plurality of retracted positions,
- wherein, for each extended position in the plurality of extended positions, the cable hook is disposed further away from the busway than the cable hook is disposed when the support structure is disposed in any retracted position of the plurality of retracted positions,
- wherein the plurality of supports are coupled to one another by a number of joints, and
- wherein, for each given joint, the given joint is structured to enable the supports that form the given joint to move about the given joint.

7. The busway system of claim 6,
wherein the support structure is configured to be manually actuated between the plurality of support structure positions.

8. The busway system of claim 6,
wherein the support structure is configured to be actuated between the plurality of support structure positions by an automated device.

9. The busway system of claim 6,
wherein the number of joints includes a number of medial joints and a number of lateral joints,
wherein the plurality of supports form a crisscrossed X pattern, and
wherein the medial joints and lateral joints enable the plurality of supports to fold and expand.

10. The busway system of claim 6, wherein the plurality of supports form a Z-shaped formation, and wherein the joints enable the plurality of supports to rotate.

* * * * *